(No Model.) 4 Sheets—Sheet 1.
J. L. COKER, Jr.
APPARATUS FOR MAKING BISULFITE SOLUTIONS.
No. 572,193. Patented Dec. 1, 1896.
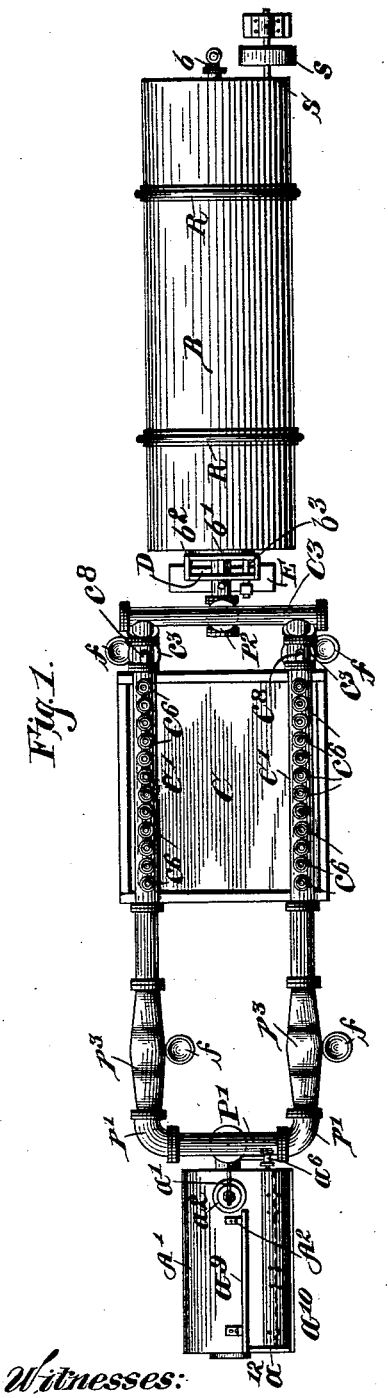
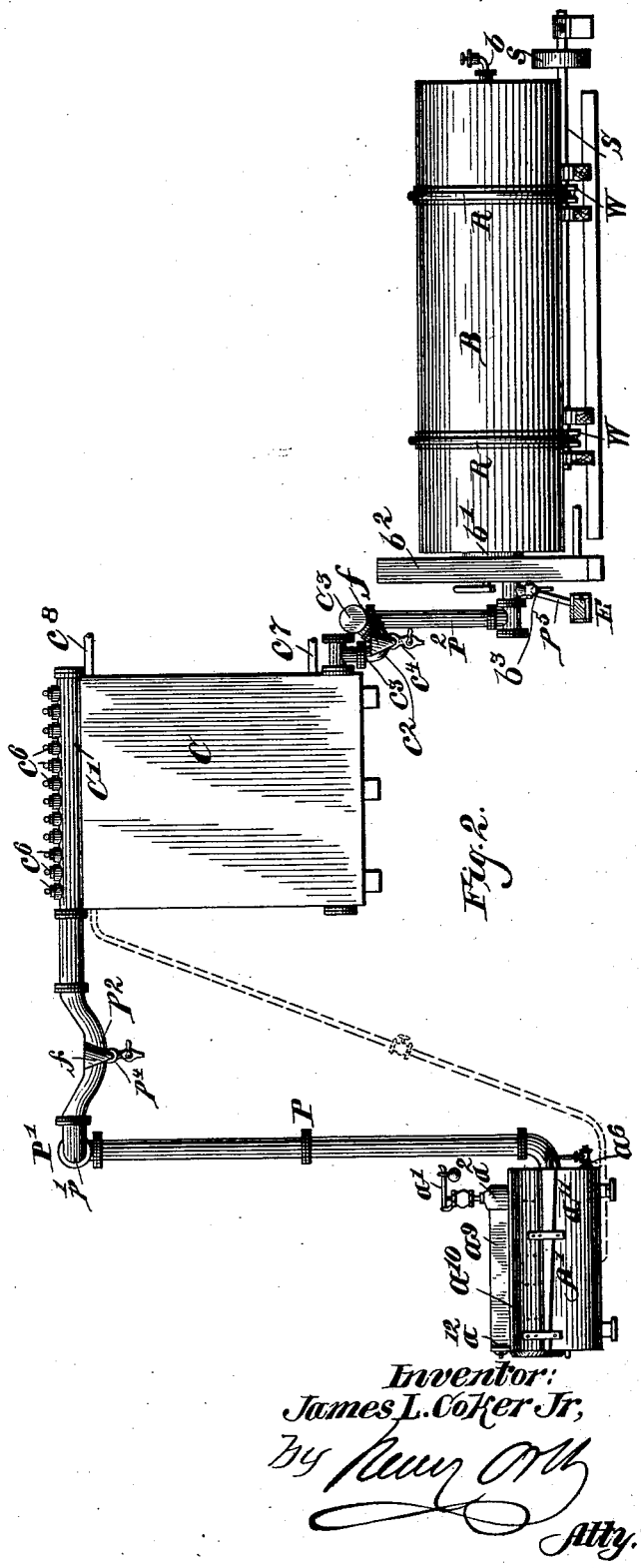

(No Model.) 4 Sheets—Sheet 2.
J. L. COKER, Jr.
APPARATUS FOR MAKING BISULFITE SOLUTIONS.
No. 572,193. Patented Dec. 1, 1896.
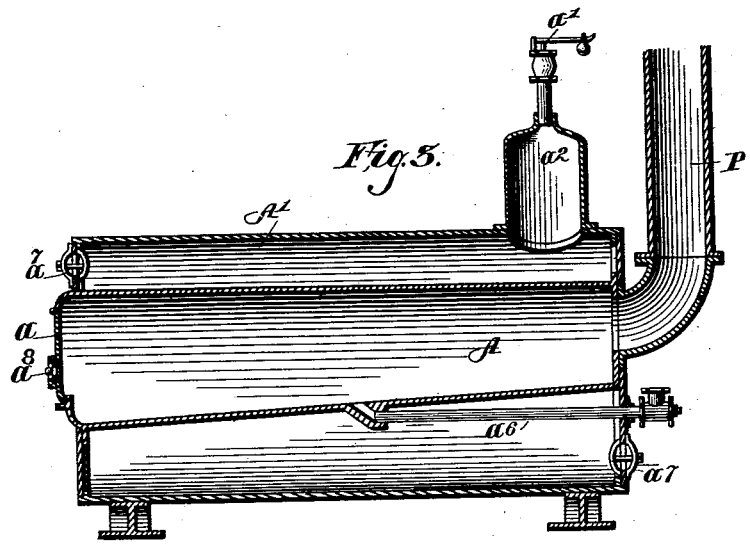
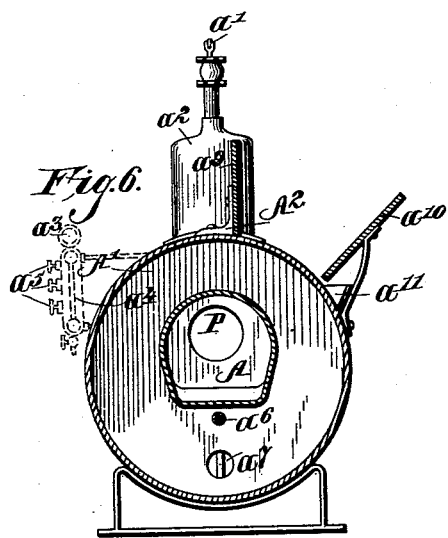
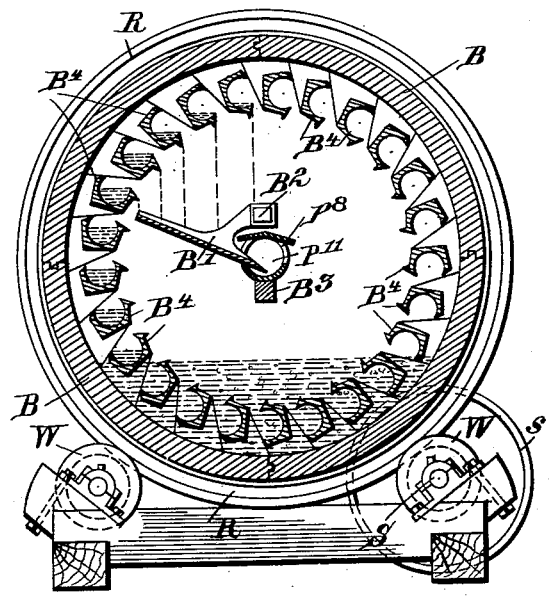
Witnesses:
H. S. Dieterich
B. W. Sommers
Inventor:
James L. Coker, Jr.
by Henry ...
Atty.

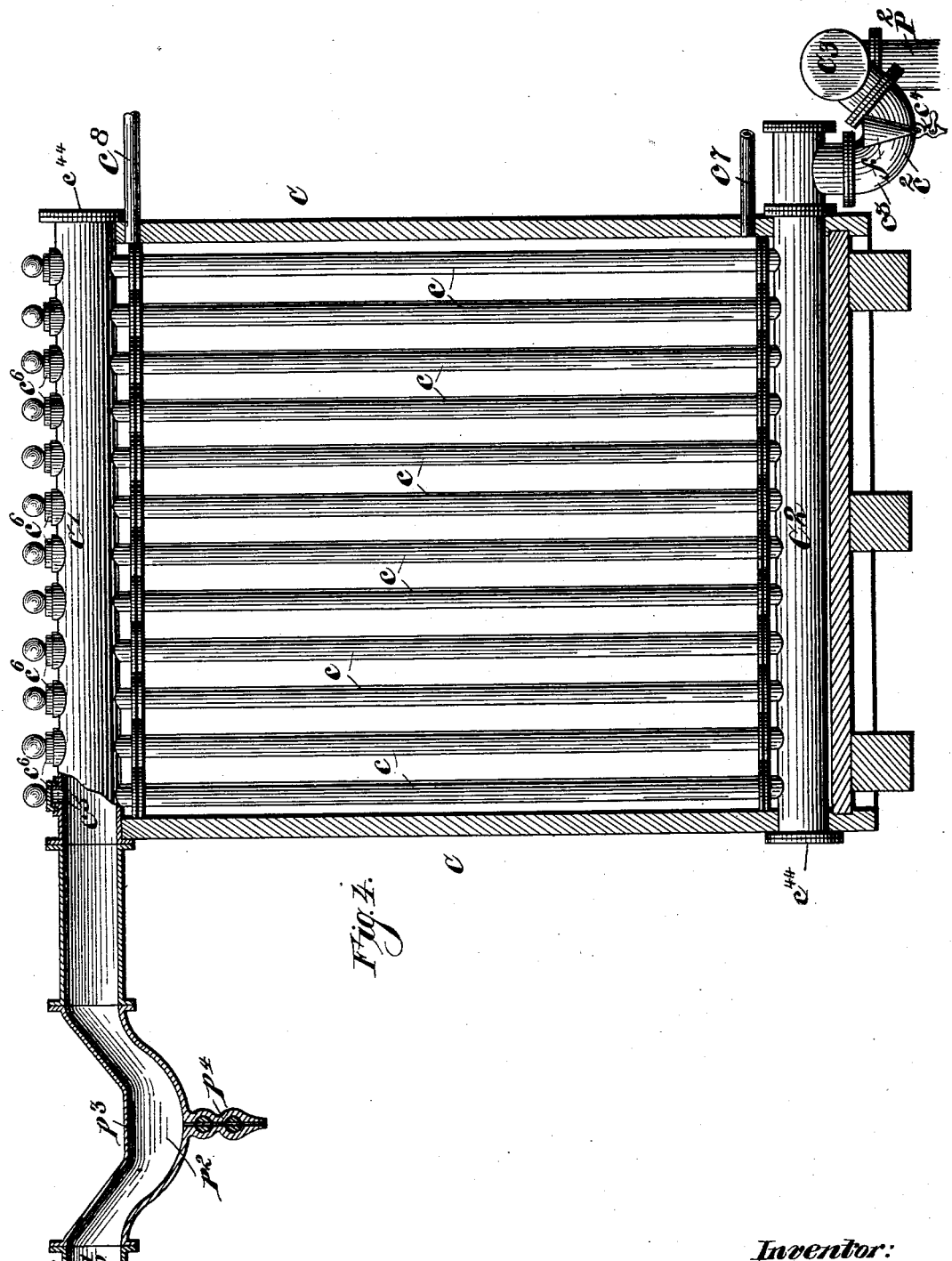

(No Model.) 4 Sheets—Sheet 4.
J. L. COKER, Jr.
APPARATUS FOR MAKING BISULFITE SOLUTIONS.
No. 572,193. Patented Dec. 1, 1896.
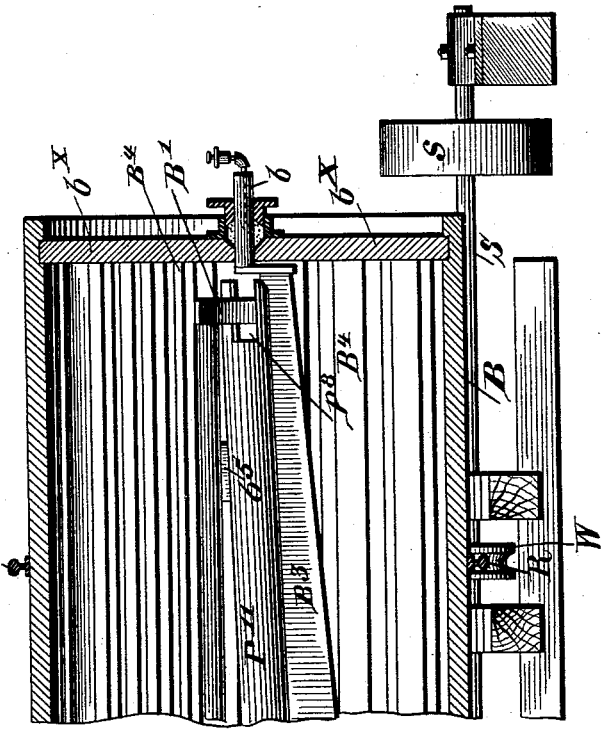
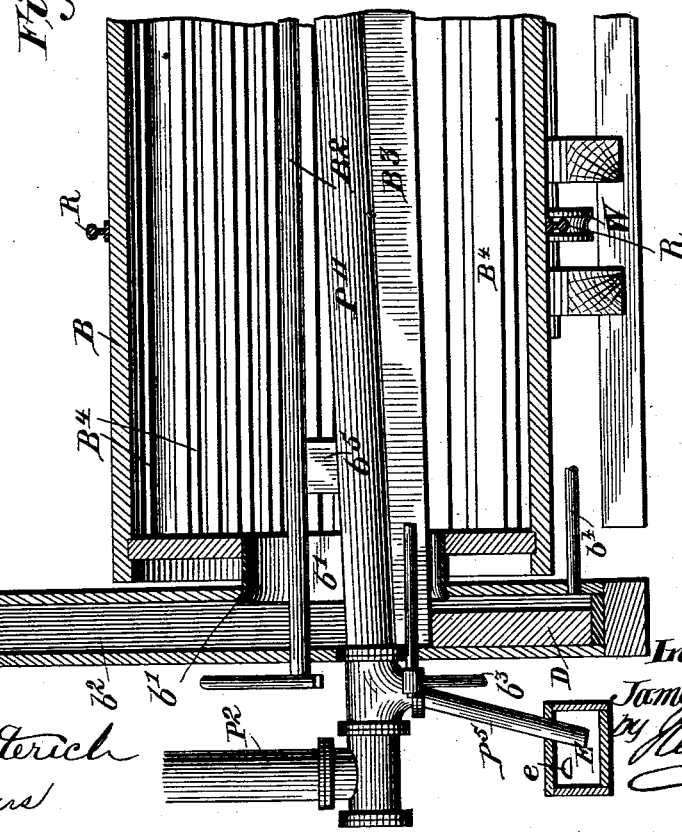
Fig. 5.
Witnesses:
H. T. Dieterich
B. W. Sommers
Inventor:
James L. Coker, Jr.
by Henry M.
Atty

UNITED STATES PATENT OFFICE.

JAMES L. COKER, JR., OF HARTSVILLE, SOUTH CAROLINA.

APPARATUS FOR MAKING BISULFITE SOLUTIONS.

SPECIFICATION forming part of Letters Patent No. 572,193, dated December 1, 1896.

Application filed September 14, 1892. Serial No. 445,914. (No model.)

*To all whom it may concern:*

Be it known that I, JAMES LIDE COKER, Jr., a citizen of the United States, residing at Hartsville, in the county of Darlington and State of South Carolina, have invented certain new and useful Improvements in Apparatus for Making Bisulfite Solutions; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to apparatus for making bisulfite solutions, and has for its object the provision of means whereby the supply of sulfurous-acid gas may be kept uniform; to the provision of means whereby the absorption of the sulfurous-acid gas, after having been suitably cooled, and the conversion of the milk of lime into a bisulfite solution are greatly expedited; to the provision of means whereby the operation of making the said bisulfite solution is made a continuous one, and to the provision of means whereby the coolers may be readily cleaned without interrupting the operation of making the bisulfite solution.

To these ends the invention consists in the combination with a sulfurous-acid-gas producer of peculiar and novel construction and with a mixer of peculiar and novel construction, of coolers, and means for cutting out one of the coolers without interrupting the working of the plant, and in other structural details and combinations of coöperative parts, as will now be fully described, reference being had to the accompanying drawings, in which—

Figure 1 is a general plan view of a plant for making bisulfite solutions embodying my invention. Fig. 2 is a general elevation thereof. Fig. 3 is a longitudinal section of the sulfurous-acid-gas producer. Fig. 4 is a sectional elevation of the cooler; and Fig. 5 is a longitudinal sectional view of the mixing-vessel, drawn to an enlarged scale. Fig. 6 is a cross-sectional view of the sulfurous-acid-gas producer, and Fig. 7 is a cross-sectional view of the mixing vessel.

Similar letters of reference indicate like parts wherever such may occur in the above-described figures of drawings.

The sulfurous-acid-gas producer, Figs. 1, 2, 3, and 6, consists of a jacketed combustion-chamber, which I have shown in the form of a cylindrical boiler $A'$, having an axial combustion-chamber A, a steam-dome $a^2$, provided with a safety-valve $a'$, and said boiler is also provided, as usual, with a pressure-gage $a^3$, level-indicator $a^4$, and suitable try or test cocks $a^5$, (shown in dotted lines in Fig. 6,) and with the necessary hand-holes $a^7$, Fig. 3. As shown in said Fig. 3, the bottom of the combustion-chamber A inclines from its rear end toward the door $a$, which is provided with a suitable draft-regulating slide $a^8$, and from the bottom of said chamber extends a feed-pipe $a^6$, adapted to feed melted sulfur to the boiler, as hereinafter explained.

Upon the boiler $A'$ is arranged a hopper $A^2$, the back board $a^9$ of which fits the boiler snugly and extends along the same to the steam-dome $a^2$, while the front board $a^{10}$ is so arranged relatively to said boiler as to leave a narrow space between the two. Below said front board $a^{10}$ is arranged a trough or gutter $a^{11}$, that extends along the hopper below the front board $a^{10}$ and is inclined in a direction the reverse of that of the bottom of the combustion-chamber A, or from front to rear, and is connected at its rear end with the feed-pipe $a^6$. The front end board $a^{12}$ of the hopper $A^2$ is adjustable longitudinally by means of bolts or pins loosely inserted into holes in the front and back boards, respectively, for the purpose of varying the bottom area of the hopper, and consequently the quantity of sulfur melted and supplied to the combustion-chamber A.

The described construction of sulfurous-acid-gas producer presents many important advantages, to wit: The feeding of the sulfur to the combustion-chamber is effected without opening the door thereof, whereby the admission of large bodies of air to said chamber, its cooling and consequent interference with a uniform rate of combustion are effectually avoided, so that the sulfurous-acid gas is obtained with the least possible quantity of air, or just the amount of air necessary, and the process of combustion carried on without check. The sulfur is supplied to the combustion-chamber in a molten state, thereby not only facilitating the feeding of the sulfur, but effecting a more uniform combustion, and consequently obtaining a more uniform production of sulfurous-acid gas of substantially uniform composition, these results being attained without an increase in the expenditures, inasmuch as the sulfur used constitutes the fuel by means of which the boiler is heated for the purpose of melting the lump sulfur.

By the means described the temperature of the boiler can be regulated by regulating the pressure therein, and by inclining the floor of the combustion-chamber A and making the end walls of the hopper adjustable the amount of sulfur burned in the furnace can be regulated with great nicety.

At its rear end the combustion-chamber A of the sulfurous-acid-gas producer is provided with a gas-exhaust port, to which is secured the lower end of a vertical pipe P, whose upper end is connected to a horizontal pipe P', provided with two branches $p'$ $p'$, respectively, connected by means of pipes $p^3$ $p^3$ with the gas-inlet pipe C' of two tubular coolers C C, Figs. 1, 2, and 4. The outlet-pipes $C^2$ of the coolers are connected with a horizontal pipe $C^3$ by means of pipes $c^3$ $c^3$, and the said horizontal pipe $C^3$ is connected with the mixing vessel by a pipe $P^2$, as hereinafter described.

The pipes or branches $p^3$ $p^3$, as well as the pipes or branches $c^3$ $c^3$, leading, respectively, to and from the inlet and exhaust pipes C' and $C^2$ of the coolers C, are so constructed as to form a trap $p^2$ and $c^2$, respectively, the said pipes having substantially the form of an ellipse, the upper side of which is flattened, as shown in Fig. 4, the said pipes being arranged to incline upwardly from opposite ends of the trap. Each of the traps $p^2$ and $c^2$ is provided with a valved purge-pipe $p^4$ and $c^4$, respectively, extending from the bottom thereof, to which is connected a funnel $f$, said funnel communicating with the pipe at a point between the valve or stop-cock and the trap. The object of this construction is not only to provide a means whereby a fluid, as water, having a great affinity for sulfuric acid may be placed in the path of the same by partially filling the trap with such fluid, the level of which is at all times observable in or through the supply-funnel $f$, but also to provide a means, as a liquid seal, for sealing the said pipes and preventing the passage of the sulfurous-acid gas through the coolers, whereby either of said coolers may be cut out of the circulation without interfering with the other when this becomes necessary from any cause.

In the cooling of the sulfurous-acid gas before mixing the same with the milk of lime flowers of sulfur are liable to be deposited within the cooling pipes or tubes, such deposits interfering with the free circulation of the gas through the coolers, and when the latter are constructed in the usual manner it is necessary to dismantle the same for the purpose of removing the deposits. To avoid this, I close one of the ends of the inlet and outlet pipes C' and $C^2$ of the cooler with a removable plate $c^{44}$, Fig. 4, so that ready access may be had thereto, while the inlet-pipe C' has a number of openings $c^5$, surrounded by a gutter or channel for the reception of a non-vaporizable or substantially non-vaporizable sealing liquid, the openings being closed by flanged caps or plugs $c^6$, whose flanges dip into the sealing liquid to form a gas-tight joint. These openings $c^5$ are in line with the vertical tubes $c$ of the cooler, so that by removing the caps or plugs after the cooler has been cut out of the circuit, as above described, a wiper may be introduced into said pipes for the purpose of removing the flowers of sulfur, which will fall into the gas-outlet pipe $C^2$, from which latter they can be readily removed by taking off the plate $c^{44}$.

Any suitable or well-known means may be employed for securing the plates $c^{44}$ to the pipes C' $C^2$, so that they may be readily removed when this becomes necessary. In practice I simply bolt the said plates to the pipe ends.

The cooling agent is supplied to and flows from the coolers through pipes $c^7$ $c^8$ near the bottom and top of said coolers, respectively.

The outlet or exhaust pipe $c^8$ of the coolers may have a valved connection with the boiler A', as shown in dotted lines in Fig. 2, in which case the coolers serve as feed-water heaters.

The mixing vessel B, Figs. 1, 2, 5, and 7, consists of a cylinder provided with annular bearing-rails R R, fitting a groove in grooved wheels W W, one set of said wheels on one side of the mixing vessel being secured to a driving-shaft S, that carries a belt-pulley $s$, by means of which the cylinder is revolved, said wheels W constituting the support for the cylinder, which latter is connected by a pipe $b'$, arranged axially in one of its heads with a vertical flue or trunk $b^2$, Fig. 5.

The vessel B has secured to its inner periphery or to its heads, or both, a series of buckets $B^4$, extending from end to end of said vessel, and, as shown in Fig. 7, the inner face of said buckets is concave, the arc being slightly greater than a semicircle, so that the buckets will take up a certain quantity of the liquid and hold the same until they have been lifted above the horizontal diametrical line of the mixing vessel B, then gradually discharge such liquid into the gaseous atmosphere within the cylinder in the form of a thin sheet that is broken up as it falls into a fine spray or rain, whereby a more perfect and rapid absorption or combination is effected than would otherwise be the case. The cross-sectional area of the buckets is preferably such as to take up but a comparatively small quantity of the milk of lime, and, as shown, said buckets are not attached to the inner periphery of the vessel B, but to brackets secured thereto in such manner as to leave a space between the buckets and the vessel B, the object of this arrangement being to prevent the taking up of a greater quantity of the milk of lime or solution than is necessary for the most economical working of the machine. As the buckets discharge their contents they fill with sulfurous-acid gas, which is carried down into the milk of lime for absorption or combination, the gas not so absorbed or combined bubbling through the liquid.

The vessel B has in its right-hand head $b^\times$ an opening through which and a suitable stuffing-box projects a journal $b$ on a supporting bar or beam $B^3$. The forward end of the bar $B^3$ has its bearings on, or is supported by, a standard D in the lower part of the flue or trunk $b^2$, and in the upper face of said bar $B^3$ is formed a longitudinal recess that is concave in cross-section, to form a bearing for the gas-delivery pipe $P^{11}$, whose outer end is connected with the vertical pipe $P^2$, leading to the coolers, and hereinbefore referred to.

The delivery-pipe $P^{11}$ is open at its inner end, and from said opening extend longitudinal slots $p^8$, the upper edges of which are bent outwardly or otherwise extended so as to project over the said slots for the purpose of preventing any liquid dropped from the buckets from entering the pipe through said slots, as shown in Fig. 7. This pipe $P^{11}$ serves, however, also as a conduit through which the bisulfite solution is conducted from the vessel B, and to this end the supporting bar or beam $B^3$ is arranged so as to incline from its outer to its inner or journaled end, so as to give the pipe $P^{11}$ sufficient inclination to allow the bisulfite solution to flow to the outer end of said pipe and through a discharge-pipe $p^5$ into a receiver E, into which the said pipe projects, said receiver having an overflow-port $e$, located above the discharge end of pipe $p^5$, whereby the same is sealed by the bisulfite solution for the purpose of preventing the escape of sulfurous-acid gas through said pipe. The bisulfite solution is delivered to pipe $P^{11}$ through the medium of a conveyer vane or board $B'$ of comparatively small area, the delivery end of said conveyer $B'$ extending into the pipe through one of the side slots $p^8$, as more clearly shown in Fig. 7.

In order that the quantity of solution delivered to pipe $P^{11}$ may be regulated or entirely cut off, the conveyer board or vane $B'$ is secured to an adjusting-bar $B^2$, that is supported in any convenient manner so as to admit of its being revolved. As shown in Fig. 5, the bar $B^2$ is supported in the trunk or flue $b^2$ and by means of suitable blocks $b^5$ on pipe $P^{11}$. It is obvious that when the adjusting-bar $B^2$ is revolved in the proper direction the conveyer-board $B'$ is moved out of the slot $p^8$ more or less, or entirely, thereby regulating the quantity of bisulfite solution collected and delivered by said board to the pipe $P^{11}$.

The milk of lime is fed to the mixing vessel B through pipe $b^3$ in a continuous stream, the excess flowing off through the central opening $b'$ into the lower part of the trunk or flue $b^2$, from which it is taken back to the source through a pipe $b^4$.

The operation of making bisulfite solutions with my improved apparatus may be briefly described as follows: The mixing vessel B is put in motion and milk of lime fed thereto in a continuous stream through feed-pipe $b^3$. A quantity of sulfur is now thrown into the furnace and ignited, the boiler $A'$ having been previously partially filled with water, which is heated by the furnace during the combustion of the sulfur and steam generated, the safety-valve $a'$ being adjusted to a pressure of about twelve pounds, as the boiler will under this pressure give off sufficient heat to melt sulfur in the hopper thereon. The amount of air admitted to the furnace A is regulated by means of the draft-slide $a^8$ by observation of the rate of combustion. The hot sulfurous-acid gas rises in the pipe P and passes through the described connections to the coolers C and the gas-delivery pipe $P^{11}$. As shown in Fig. 2, the coolers are located some distance above the generator and mixing vessel, by which arrangement I am enabled to dispense with the forcing or suction apparatus heretofore employed to force or draw the gas into the mixing vessel, for the reason that the hot and consequently lighter sulfurous-acid gas will readily rise in pipe P and thence pass to the coolers, wherein it is cooled and becomes denser or heavier, and will as readily sink or flow down the pipe $P^2$ into and through the delivery-pipe $P^{11}$ by reason of the difference in the specific gravity of the hot and cooled gases. This flow of the gas into the mixing vessel is rendered possible because it is not opposed or antagonized by a liquid, (as is the case in apparatus in which the gas is forced into the milk of lime,) but flows freely into a gaseous atmosphere that is not confined but in continuous motion from the rear end of the vessel B to its forward open end, where such gases as do not enter into combination with the sulfurous-acid gas and milk of lime, as nitrogen, for instance, can escape freely into and through the flue $b^2$. As the sulfurous-acid gas enters the vessel B it encounters the milk of lime as it is discharged by the buckets $B^4$, and gradually combines therewith, so that the milk of lime at the rear or closed end of the mixing vessel will soon be converted into a bisulfite solution. The delivery vane or board $B'$ is now adjusted to deliver bisulfite solution to the pipe $P^{11}$ at a rate proportionate to the rate of combustion of the sulfur. The plant having now been started, when it becomes necessary to supply more sulfur to the furnace, the lump sulfur is charged into the hopper $A^2$, melted, and allowed to run into the furnace through the connections described, the quantity of sulfur supplied to the furnace being regulated as found necessary by contracting the area of said hopper.

It has been stated that the milk of lime is supplied to the vessel in a continuous stream. Hence such regulating devices as valves or stop-cocks usually employed, and which are liable to become inoperative by reason of lime deposits, are dispensed with. This is made possible in my improved plant, owing to the fact that the mixing or combining of the sulfurous-acid gas does not take place at all points of the mixing vessel B, but chiefly at a certain portion thereof between its open and closed ends, the milk of lime at the overflow containing practically no sulfurous acid, so that the supply of milk of lime can be in excess of the discharge of bisulfite solution, and in fact it should be in excess in order to insure a constant normal quantity of milk of lime within the mixing vessel.

The advantage and economy of using the gas-supply pipe for the purpose of educting the bisulfite solution from the mixing vessel will be readily understood by those conversant with the state of this art.

Having thus described my invention, what I claim as new therein, and desire to secure by Letters Patent, is—

1. In an apparatus for making bisulfite solutions, a revoluble mixing vessel provided with an overflow-opening in one of its heads, and with internal buckets, in combination with a sulfurous-acid-gas-supply pipe extending into said vessel through said overflow-opening and having its discharge proximate to the opposite head of such vessel, for the purpose set forth.

2. In an apparatus for making bisulfite solutions, the combination with a revoluble mixing vessel provided with internal buckets and with a central overflow in one of its heads, of a gas-supply pipe opening into the vessel above the normal level of liquid therein, said supply-pipe adapted to convey liquid dropped from the buckets out of the mixing vessel into a separate receiver, substantially as set forth.

3. In an apparatus for making bisulfite solutions, a mixing vessel adapted to be partially filled with milk of lime, means for raising and dropping such liquid, and a sulfurous-acid-gas-supply pipe opening into the vessel above the normal level of liquid therein, said pipe adapted to receive and discharge into a separate receiver some of the dropping liquid, substantially as and for the purpose set forth.

4. In an apparatus for making bisulfite solutions, the combination with a revoluble mixing vessel provided with a central overflow-opening in one of its heads, and with internal buckets, of a gas-supply pipe extending in an upward direction into said vessel through the overflow-opening and having a discharge-pipe near its outer end, and a conveyer connected with the outlet of said supply-pipe adapted to convey liquid discharged from the buckets into such pipe, for the purpose set forth.

5. In an apparatus for making bisulfite solutions, the combination with a revoluble mixing vessel provided with internal buckets and with a central opening in one of its heads, a sulfurous-acid-gas-supply pipe extending in an upward direction into the vessel through said overflow-opening, said pipe provided near its inlet with a discharge-pipe and having its outlet proximate to the closed end of the vessel, and an adjustable conveyer as a board or vane B', connected with the outlet of the gas-pipe and adapted to convey liquid discharged from the buckets into said pipe, for the purpose set forth.

6. In apparatus for making bisulfite solutions, a mixing vessel having a central overflow in one of its heads, a gas-duct extending into said vessel above the liquid therein and having its outlet near the closed end of the vessel, mixing devices for mixing the gas with a liquid in the vessel, a conveyer for conveying liquid into the gas-duct at the discharge end thereof, a discharge-pipe at the inlet end of said duct, a receiver into which said discharge-pipe projects, said receiver having its outlet above the outlet of the discharge-pipe, for the purpose set forth.

7. In apparatus for making bisulfite solutions, a sulfurous-acid-gas producer comprising a combustion-chamber, a receptacle thereon for lump sulfur and means for conveying the molten sulfur to the combustion-chamber, for the purpose set forth.

8. In apparatus for making bisulfite solutions, a sulfurous-acid-gas producer comprising a jacketed combustion-chamber, a receptacle thereon for lump sulfur, and appliances for conducting the molten sulfur from the receptacle to the combustion-chamber, for the purpose set forth.

9. In apparatus for making bisulfite solutions, a sulfurous-acid-gas producer, comprising a combustion-chamber, a receptacle thereon for the lump sulfur adjustable as to area, and appliances for conducting the molten sulfur from the receptacle to the combustion-chamber, for the purpose set forth.

10. In apparatus for making bisulfite solutions, a sulfurous-acid-gas producer comprising a jacketed combustion-chamber, a receptacle or hopper thereon adjustable as to area, an opening between one of the side walls of the hopper and the jacket of the combustion-chamber, a gutter or trough extending along said opening, and a pipe connecting the gutter with the combustion-chamber, substantially as and for the purpose set forth.

J. L. COKER, JR.

Witnesses:
W. R. ERWIN,
J. J. LAWTON.